UNITED STATES PATENT OFFICE.

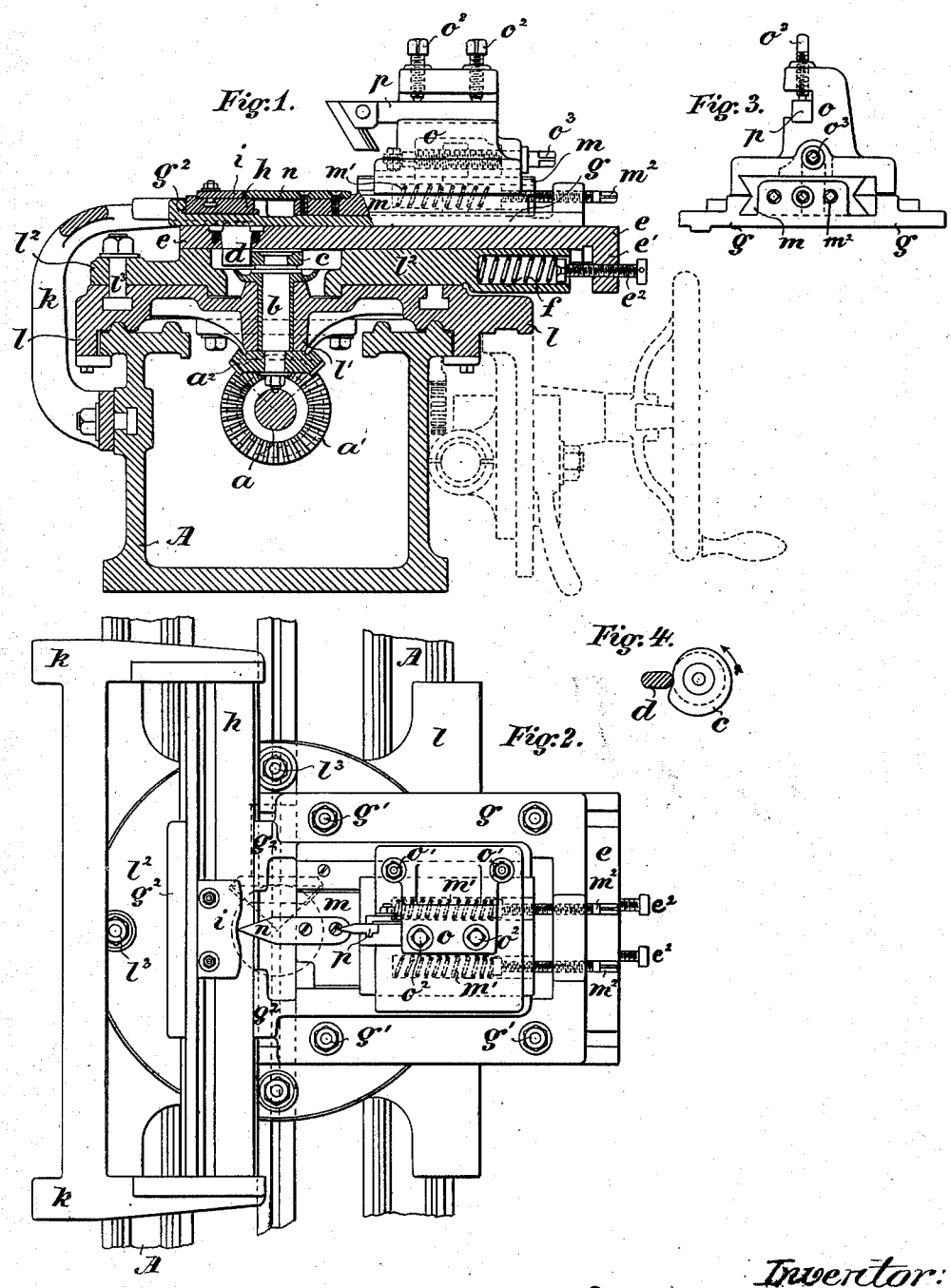

JOHANNES G. REINECKER, OF GABLENZ, NEAR CHEMNITZ, GERMANY.

MACHINE FOR MANUFACTURING RELIEVED-FORMED REVOLVING TOOLS.

SPECIFICATION forming part of Letters Patent No. 519,820, dated May 15, 1894.

Application filed August 24, 1893. Serial No. 483,929. (No model.)

*To all whom it may concern:*

Be it known that I, JOHANNES GEORG REINECKER, a subject of the King of Saxony, residing at Gablenz, near Chemnitz, in the Kingdom of Saxony, German Empire, have invented new and useful Improvements in Machines for Manufacturing Relieved-Formed Revolving Tools, of which the following is a specification.

My invention relates to improvements in the manufacture of revolving cutters such as are used for working metal, wood, stone, leather and other like material, and which tools are commonly designed to cut such material in profile.

The object of my invention is to overcome the difficulties at present experienced in the manufacture of the said tools which difficulties result from the necessity of cutting or "backing off" the tools on the whole of their breadth at once. This can, at present, only be done by means of very expensive tools operated by heavy machines and even in this case, only such tools can be produced which have no spiral or twisted grooves. Tools with twisted or spiral grooves, nevertheless, have a great advantage over those with straight grooves, especially in the case of cutters of considerable breadth, for the reason that they produce a more accurate surface, and offer less resistance and therefore require less power to drive them. I attain these objects by the mechanism illustrated in the accompanying drawings, in which—

Figure 1 is a vertical cross section of a turning-lathe provided with the improvements constituting my invention. Fig. 2 is a plan of the machine. Fig. 3 is a side view in part, and Fig. 4 is a detail view of a cam hereinafter described.

Similar letters refer to similar parts throughout the several views.

A represents the bed of a turning lathe, upon which is mounted a slide-rest $l$, provided with a hub $l'$, bored out so as to form a bearing for a spindle $b$, a suitable lining being preferably inserted between the spindle and the said hub $l'$. The said spindle is provided on one end with a pinion $a^2$ engaging with a pinion $a'$ fixed upon the driving shaft $a$, and on the other end is secured a cam $c$, the form or shape of which is clearly seen in the detail view, Fig. 4. A plate $l^2$ is secured upon the slide-rest $l$ by means of screw bolts $l^3$, and forms a sliding bed for a slide $e$ which moves in a transverse direction to the slide rest $l$. The slide $e$ on its lower side at one extremity carries a pin $d$ and is provided at its opposite extremity with a projection $e'$. One or more springs $f$ arranged in recesses in the plate $l^2$ and pressing against a screw bolt $e^2$, carried by the said projection of the slide $e$, tend to press the pin $d$ against the surface of the cam $c$. On rotating this cam $c$ in the direction of the arrow shown in Fig. 4 the slide $e$ is alternately moved forward by the cam and brought back again by the action of the springs $f$; this movement being timed in such a manner that for each revolution of the blank (from which the tool is to be produced) the cam $c$ makes a number of revolutions corresponding to the number of teeth to be formed on the said blank, during one revolution of the latter.

A plate $g$ is fixed on the slide $e$ by means of set screws $g'$ $g'$, and is provided with an extension $g^2$ which has formed therein grooves for receiving a blade $h$ carrying the former $i$. Lateral guides $k$, $k$ secured to the frame A, project upward and are so arranged as to allow the said blade $h$ to move only in a transverse direction. Upon the said plate $g$ rests a sliding plate $m$ capable of being adjusted by springs $m'$ and set screws $m^2$ passing through the projection on the plate $g$, the said plate $m$ having secured thereto the follower or guiding pin $n$ which is arranged on the same level as and engages with a former $i$, the said follower $n$ being constantly pressed against the former $i$ by the springs $m'$. To the plate $m$ is attached the tool holder $o$ which may be adjusted thereon by set screws $o'$ the said tool holder carrying the turning tool $p$ which is secured thereto by set screws $o^2$ and formed at its operating end of the same shape as the follower $n$. Screw $o^3$ is for feeding forward the cutter (Fig. 1).

The operation of the improved machine is as follows:—The shaft $a$ being revolved the cam $c$ is moved around its axis (see Fig. 4) and, by reason of its co-operation with the pin $d$, a reciprocating motion is imparted to the slide $e$, plate $g$, blade $h$, former $i$ as well as plate $m$, follower $n$, head $o$ and tool $p$. This constitutes the so called relieving or "backing off" motion. If during the said motion, the slide rest $l$ is moved longitudinally, by the ordinary well known operating devices, the slide $e$, plate $g$, plate $m$, follower $n$, head $o$ and turning tool $p$ are caused to partake in this motion, but the blade $h$ and former $i$, are by means of the guide arms $k$, prevented from following this motion. In this way the follower $n$ is caused to slide along the former $i$ and in consequence thereof the turning-tool $p$, performing a motion similar to that of the follower $n$, will produce a cutter which will conform in shape to that of the former $i$. If a tool with straight grooves arranged parallel to the axis is to be produced, the cam $c$ must accurately perform as many revolutions as there are teeth to be cut on the blank; but if tools with spiral or twisted grooves or flutes wound in a right or left handed direction are to be produced, then the movement of the shaft $a$ driving the cam $c$ must either be retarded or accelerated. This being performed in a manner and by means well known to those skilled in the art, no further explanation is needed.

I am aware, that in the manufacture of wooden articles, formers in combination with followers have been employed, but

What I claim, and desire to secure by Letters Patent, is—

1. In a machine for relieving or backing off revolving cutters, the combination of the slide rest $l$ carrying slide $e$ and adjustable plate $m$ having the follower $n$ and turning tool $p$ secured thereto, with blade $h$ and former $i$ guided by arms $k, k$ fixed to the frame of the machine and means for imparting a reciprocating motion to the slide $e$ and its accessory parts, substantially as and for the purpose described.

2. In a machine for relieving or backing off revolving cutters, the combination of the former $i$ with a blade $h$ embedded in plate $g$, $g^2$ secured to the reciprocating slide $e$ and fixed arms $k, k$ guiding the said blade in transverse direction substantially as and for the purpose specified.

3. The combination of the bed A, slide rest $l$ plate $l^2$ secured thereto, slide $e$ adapted to move in guides on said plate $l^2$ pin $d$ secured to slide $e$ a cam $c$ adapted to engage with pin $d$ and maintained in contact therewith by springs $f$ in operative connection with the slide $e$ the tool holder $o$ connected with slide $e$ and means for limiting the travel of said holder, substantially as set forth.

4. The combination of the bed A slide rest $l$ plate $l^2$ slide $e$ provided with a pin $d$ which engages with a cam $c$ the plate $g$ secured to slide $e$ blade $h$ provided with a former $i$ guides $k\,k$ for said blade fixed to the bed A and the adjustable plate $m$ connected to plate $g$ by springs $m'$ and screws $m^2$ and provided with a follower $n$ and tool holder $o$ operating as and for the purpose specified.

In testimony whereof I have hereunto set my hand in the presence of two subscribing witnesses.

JOHANNES G. REINECKER.

Witnesses:
C. J. DIETRICH,
R. GUST. WOLF.